(12) United States Patent
Wallace et al.

(10) Patent No.: US 12,187,546 B2
(45) Date of Patent: Jan. 7, 2025

(54) EMBEDDED MAGNETIC RIP INSERTS USING PRINTING TECHNOLOGIES

(71) Applicant: ContiTech AG, Hannover (DE)

(72) Inventors: Jack Bruce Wallace, Powell, OH (US); Andrey Minkin, Adelebsen (DE); Christel Bäuerle-Müller, Hannoversch Muenden (DE); Stavros Podias, Goettingen (DE); Janosch Kneer, Freiburg (DE); Juerg Schleuniger, Hartheim (DE); Jacques Frederick Basson, Braga (PT); Sebastian Seibold, Hannoversch Muenden (DE)

(73) Assignee: ContiTech Deutschland GmbH, Hannover (DE)

( * ) Notice: Subject to any disclaimer, the term of this patent is extended or adjusted under 35 U.S.C. 154(b) by 79 days.

(21) Appl. No.: 18/147,041

(22) Filed: Dec. 28, 2022

(65) Prior Publication Data
US 2024/0217751 A1     Jul. 4, 2024

(51) Int. Cl.
| | |
|---|---|
| *B65G 43/02* | (2006.01) |
| *B32B 25/04* | (2006.01) |
| *B65G 15/32* | (2006.01) |
| *G06T 7/00* | (2017.01) |

(52) U.S. Cl.
CPC ............. *B65G 43/02* (2013.01); *B32B 25/04* (2013.01); *B65G 15/32* (2013.01); *G06T 7/0004* (2013.01); *B32B 2255/10* (2013.01); *B32B 2255/205* (2013.01); *B32B 2433/02* (2013.01); *B65G 2207/48* (2013.01)

(58) Field of Classification Search
CPC ....... B32B 25/04; G06T 7/0004; B65G 43/02; B65G 2203/0275; B65G 15/32

USPC ................................................... 198/810.02
See application file for complete search history.

(56) References Cited

U.S. PATENT DOCUMENTS

| | | | |
|---|---|---|---|
| 4,621,727 A * | 11/1986 | Strader .................. | B65G 43/02 340/676 |
| 4,854,446 A * | 8/1989 | Strader .................. | B65G 43/02 340/676 |
| 6,264,577 B1 * | 7/2001 | Hutchins ............. | B60C 23/0493 198/810.02 |
| 7,275,637 B2 * | 10/2007 | Brown .................... | G01N 27/83 198/810.02 |
| 8,069,975 B2 | 12/2011 | Wallace | |
| 8,662,290 B2 * | 3/2014 | Twigger .................. | B65G 43/02 198/810.01 |

(Continued)

FOREIGN PATENT DOCUMENTS

| | | | | |
|---|---|---|---|---|
| WO | WO-2021078702 A1 * | 4/2021 | ............. | B65G 15/00 |
| WO | 2021122632 A1 | 6/2021 | | |

OTHER PUBLICATIONS

PCT International Search Report dated Mar. 19, 2024 corresponding to International Search Report PCT/EP2023/085933.

*Primary Examiner* — James R Bidwell
(74) *Attorney, Agent, or Firm* — Gregory J. Adams; Richard A. Wolf

(57) ABSTRACT

A printed magnetic rip insert and system for monitoring conveyor belts using printed rip inserts is disclosed. The system includes: a plurality of printed rip insert elements on a substrate of a conveyor belt; a field generator for generating a magnetic field proximate the printed rip insert elements; and a detector for detecting an image of a magnetic field produced by the plurality of printed rip inserts.

20 Claims, 5 Drawing Sheets

(56) References Cited

U.S. PATENT DOCUMENTS

| | | |
|---|---|---|
| 2017/0305682 A1 | 10/2017 | Wallace et al. |
| 2023/0159278 A1* | 5/2023 | Ishibashi ................ B65G 15/08 198/810.02 |
| 2024/0101357 A1* | 3/2024 | Kneer ................ G06K 19/0717 |

* cited by examiner

EMBEDDED MAGNETIC RIP INSERTS USING PRINTING TECHNOLOGIES

FIELD

The field to which the disclosure generally relates is rubber, thermoplastic elastomers (e.g., TPE, PET) and/or elastomeric products, such as conveyor belts, exposed to harsh conditions, and in particular sensors for monitoring belt and rubber containing products.

BACKGROUND

Conveyor belts are widely used for moving minerals, coal, and a wide variety of manufactured products from one point to another. Heavy duty conveyor belts used in mining operations can extend over distances of several miles and represent a high cost component of an industrial material handling operation. Unfortunately, such conveyor belts are susceptible to damage from the material transported thereon and a rip, slit, cut or tear may develop within the belt. For instance, sharp edges of the material being transported can gouge the surface of the belt and that can result in a rip developing.

After being detected a torn or ripped belt can be repaired. However, the cost of repairing a heavy duty conveyor belt and cleaning up material spilled as a result of the damage can be substantial. In cases where such damage is not detected and repaired promptly, the rip typically propagates along the length of the belt with continued use of the conveyor system which makes the repair even more difficult and costly. It is accordingly desirable to detect damage to the belt as soon as possible after it occurs and to quickly repair the damaged area of the belt. By doing so the extent of the damage to the belt can be minimized and the spillage of material being conveyed can be reduced.

Over the years, a number of systems have been developed for detecting belt damage and for automatically stopping further movement of the belt after the damage occurs. One system is to employ sensors within conveyor belts as part of a rip detection system. Sensors in the form of loops of conductive wire are affixed or embedded in the belt and provide a rip detection utility as part of an overall rip detection system. Rip detection is achieved through the inferential detection of an "open circuit" condition in one or more of the sensor loops in the belt. Typically, an electrical energy source external to the belt is inductively or capacitively coupled to a sensor loop in the belt. A break in the conductive wire loop of the sensor may be detected by a remote transmitter/receiver (exciter/detector). Disposition of a plurality of such sensors at intervals along the conveyor may be detected with each sensor passing within read range of one or more exciter/detectors at various locations. A rip or tear will encounter and damage a proximal sensor loop and the existence of the tear will be inferred when the proximal sensor loop damage is not detected due to being in an open circuit condition when it passes by the reader. In this manner, the existence of a tear will be promptly detected and repaired with further damage to the belt being minimized.

A similar method of monitoring for longitudinal rips was developed using magnetic sensors that detect magnetically permeable rip inserts that are embedded into the conveyor belt. If the disposition of a plurality of such sensors at intervals along the conveyor, it is possible to monitor for longitudinal damage events by detecting damage to these rip inserts. These sensors have advantages over inductive loops in that the damage is directly detected in the magnetic field image generated by the passing rip insert, as opposed to the inductive loops which depend on the "non-detection" of a loop at a given location to generate an alarm. This active detection of the damage, also provides the user with information about the damage, magnitude and location. This is important to reduce the time it takes to locate and inspect the damage event, saving the mine downtime associated with this activity.

Typical rip inserts rely on sensor wires to be embedded in the conveyor belt to generate a magnetic signature that is detectable over the signal of the conveyor belt using magnetic field sensors, such as, magnetorestrictive, inductive coils or hall effect sensors. These wire based sensors have a defined gauge associated and this gauge can require a larger/thicker pulley cover than otherwise to handle the defined gauge. Furthermore, these rip inserts are produced in a separate process from the belt manufacturing process, and thus require to be inserted into the belt during manufacture in an added step, adding to manufacturing time and potentially impacting the quality of the belt.

Accordingly, there is a need to provide thinner profile rip insert sensors to enable these sensors to be utilized in a wider range of conveyor belt applications that require thinner cover dimensions. In an optimized process, it is possible that these sensors could be applied during the belt manufacturing process as part of the process, not a separate installation, improving belt integrity and reducing manufacturing time and cost.

DETAILED DESCRIPTION

Figure 1:
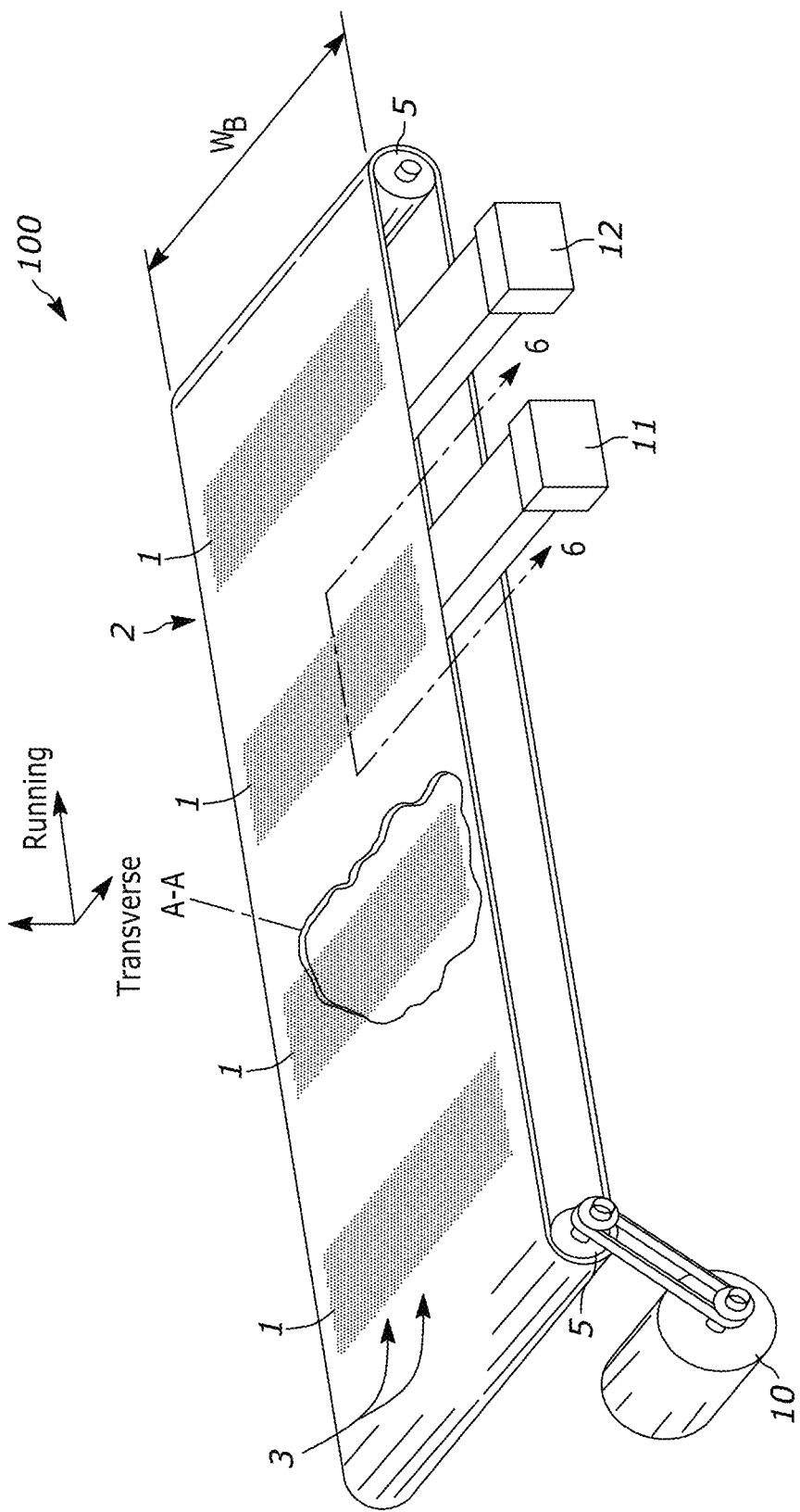
FIG. 1 shows an example of a conveyor belt system 100 configured in an endless loop or belt.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one, and the singular also includes the plural unless otherwise stated.

The terminology and phraseology used herein is for descriptive purposes and should not be construed as limiting in scope. Language such as "including", "comprising", "having", "containing", or "involving", and variations thereof, is intended to be broad and encompass the subject matter listed thereafter, equivalents, and additional subject matter not recited.

Also, as used herein, any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

It is appreciated that the current rip insert technology is fabricated in an in-line process where small magnetically permeable material (wires) are embedded parallel to one another in a sheet of rubber. These sheets are cut joined in a fashion to create a biased design where wires are exposed on every edge of a trapezoidal shape. This allows for numerous wires to be installed in the belt at a 45 degree bias in order to cover the width of the belt such that if a longitudinal rip event occurs that a series of wires will be damaged and create a magnetic signal that can be detected by a Hall Effect sensor array monitoring the width of the belt. This is a rather cumbersome secondary manufacturing process outside of the belt manufacturing processes.

It is appreciated that current rip inserts rely on sensor wires to be embedded in the conveyor belt to generate a magnetic signature that is detectable over the signal of the conveyor belt using hall effect sensors. These wire-based sensors have a defined gauge associated and this gauge can require a larger/thicker pulley cover than otherwise to handle the defined gauge.

Additionally, installing the wire based rip inserts is problematic. Typically, fabrication time of the conveyor belt is increased as these rip inserts are embedded into the belt. Substantial manufacturing time can be added to the belts manufacturing process by with the installation of these rip inserts. In conveyor belts with thin covers, these wire-based inserts can impact the performance of the conveyor belt as they take a significant amount of the pulley covers thickness, limiting the protection of the rip insert by the rubber or elastomeric cover. In an effort to remove this dimensional restriction, low profile printed rip inserts are proposed as a solution.

One or more embodiments are disclosed that utilize printed rip inserts having printed elements.

FIG. 1 is a diagram illustrating a conveyor belt system 100 using printed rip inserts in accordance with one or more embodiments. The system 100 is provided for illustrative purposes and it is appreciated that suitable variations are contemplated.

The system 100 includes a pulley system 5 which is adapted for receiving a pulley engaging surface of belt(s) 2 of this invention, a drive mechanism 10 for driving the belt 2 along the pulley system 5, a field generator 11 for generating a magnetic field within the rip detection elements 3, and a detector 12 for detecting the image of the magnetic field produced by printed rip inserts 1.

The image of the magnetic field 13 and 14 is typically detected over the entire width of the belt 2. In order to determine the length of a rip detection panel a tachometer, proximity sensor, encoder and/or the like can be incorporated into the system 100.

The printed rip inserts 1 have mitigated exposure to environmental conditions, such as moisture and avoid/mitigate degradation such as rust and the like.

Figure 2:
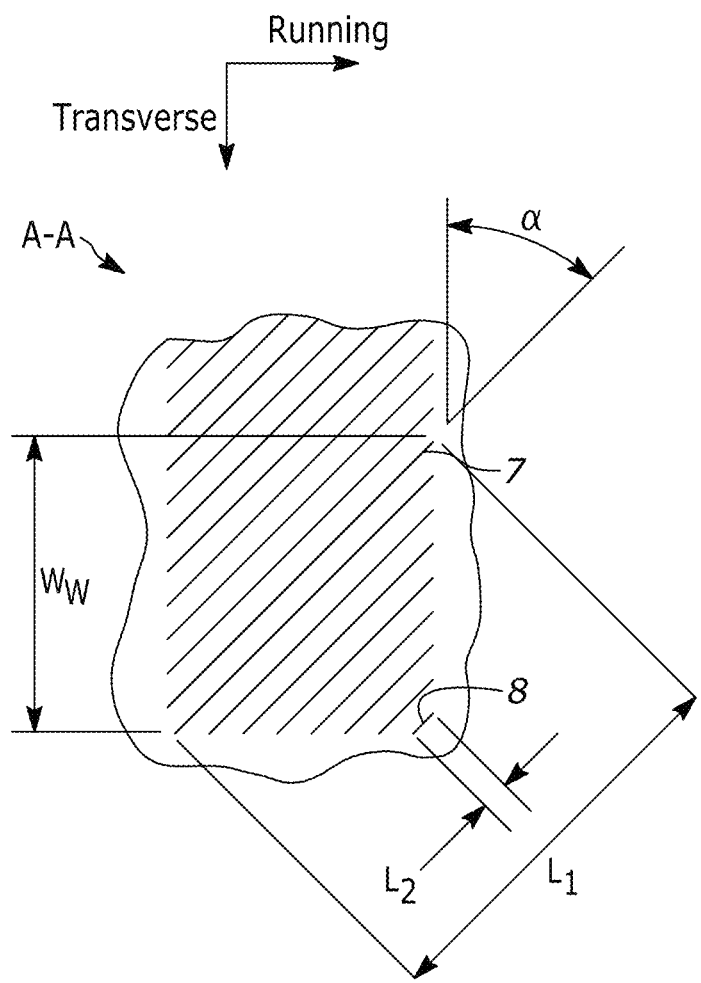
FIG. 2 is a diagram illustrating a schematic view 200 of the conveyor belt system 100 in accordance with one or more embodiments.

FIG. 2 is a diagram illustrating a portion A-A of the conveyor belt system 100 using printed rip inserts in accordance with one or more embodiments. It is appreciated that suitable variations are contemplated.

Rip detection elements 8 are aligned in the rip detection inserts 1 at a bias angle α, for example 15° to 75°, from being perpendicular to the longitudinal direction of the belt 2, in this example.

The rip detection elements 8 are spaced incrementally across the width of the belt WB in this example. In one example, individual rip detection elements do not extend across more than about 70% of the width of the belt WW. In some cases individual rip detection elements do not extend across more than about 50% of the width of the belt WW. More typically individual rip detection elements do not extend across more than about 40% or even 30% of the width of the belt WW.

In one example, the rip insert elements 7,8 vary in length along a line running through the rip detection inserts 1 which is perpendicular to the bias angle α, and wherein the shortest rip detection wires 8 have a length L2 which is less than about 50% of the length L1 of the longest rip detection elements 7 in the rip inserts 1. Typically, the shortest rip detection elements have a length L2 which is less than about 25% of the length L1 of the longest rip detection elements. In some cases the shortest rip detection elements have a length L2 which is less than about 10% of the length L2 of the longest rip detection elements in the rip detection inserts 1.

It is appreciated that a convention rip insert includes wires and typically has thicknesses of 0.5 mm to 3.0 mm. This amount includes the overall gauge of the wires and the treatment that holds the position of the wires. The treatment is typically an extrusion of rubber around the parallel wires spaced at a given pitch in order to produce a rip insert of the desired dimensions to generate the desired magnetic properties for the application.

The printed rip insert 1 and corresponding elements 7,8 have example/suitable thicknesses in the range of 0.05 mm to 2 mm. It should be pointed out that this range covers a single printed layer to a large stack of printed patterns that can generate the desired magnetic field for reliable damage detection in a conveyor application.

Figure 3:
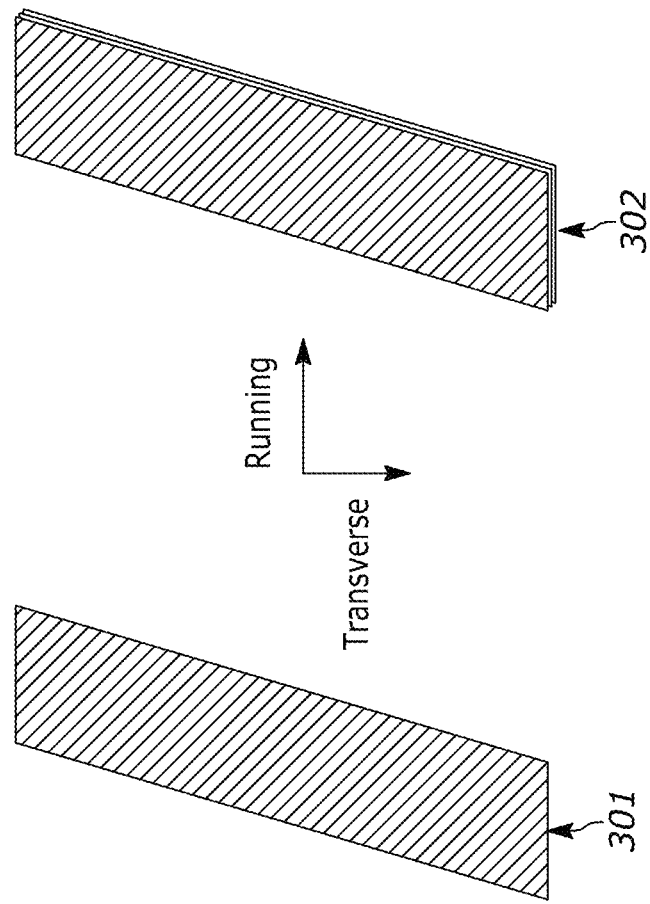
FIG. 3 is a diagram illustrating a printed rip insert 300 in accordance with one or more embodiments.

FIG. 3 is view of printed rip inserts 301, 302 in accordance with one or more embodiments. The inserts are provided for illustrative purposes and it is appreciated that suitable variations are contemplated.

The inserts 301, 302 have parallel elements aligned at an angle.

A single stack printed rip insert 301 has a single layer of printed elements.

A multi-stack printed rip insert 302 has a plurality of layers of printed elements.

The magnetic strength can be increased by having multiple layers of printed magnetic elements.

The printed rip insert consists of a layer of magnetizable material and a substrate, e.g. a polymer foil or a elastomeric patch or a rubber patch. In a beneficial design the substrate is of similar or same material than the adjacent interfaces the printed rip insert is embedded towards.

Figure 4:
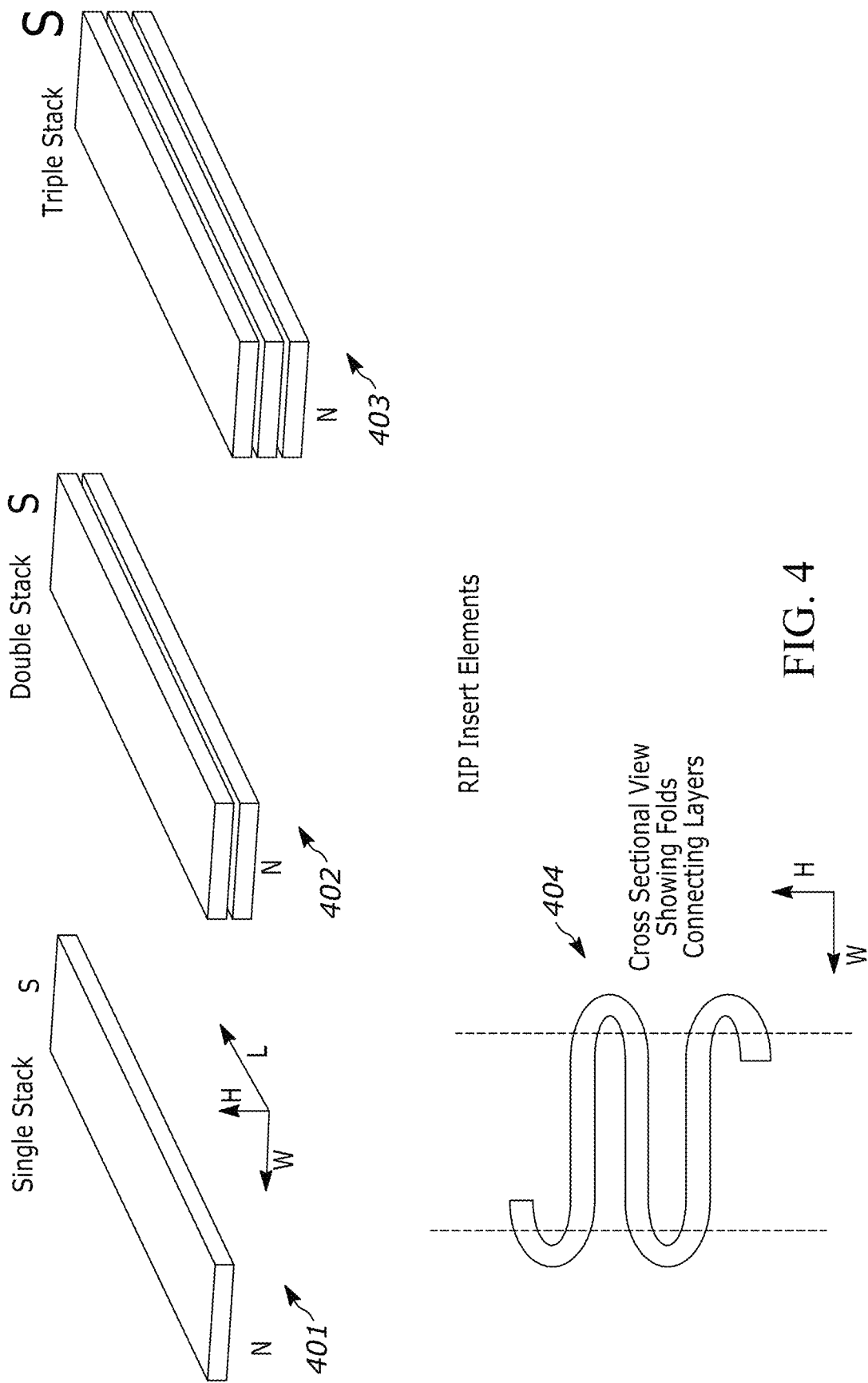
FIG. 4 is a diagram illustrating a rip insert element 400 in accordance with one or more embodiments.

The printed rip insert can further consist of additional layers, e.g. for encapsulation or lamination purpose like UV-curable vanish, elastomeric foils made of thermoplastic elastomers (TPEs, PET etc.) or rubber FIG. 4 is a view of a printed rip insert elements in accordance with one or more embodiments. The elements are provided for illustrative purposes and it is appreciated that suitable variations are contemplated.

As stated above, a printed rip insert 1, 301, 302 includes a plurality of elements which are printed on substrates and/or layers of conveyor belts.

A single layer stack printed element 401 has a single printed layer of ferromagnetic material as shown. The layer has a width (w), height (h) and length (I). A single layer 401 has a single printed element. Magnetic poles N and S are as shown.

A double stack element 402 has first and second printed layers of ferromagnetic material. Each layer has a w, h and I and there is an offset or gap between the layers.

A triple stack element 403 has three printed layers of ferromagnetic material. Each layer has a w, h and I and there is an offset or gap between the layers.

It is appreciated that printed rip inserts having other suitable numbers of layers to form stacks have varied numbers of layers are contemplated.

Individual printed layers can be connected using one or more suitable techniques.

Figure 5:
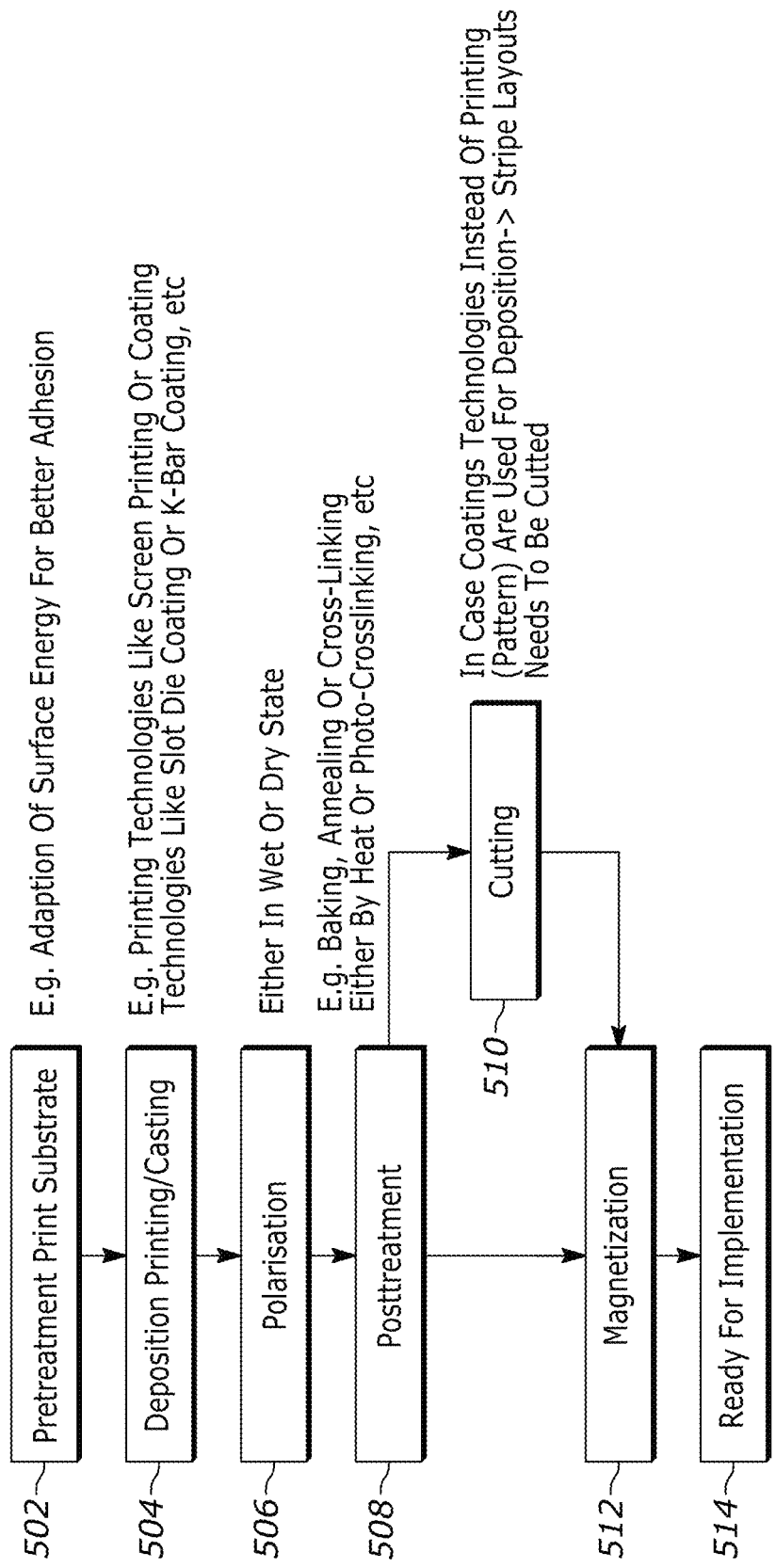
FIG. 5 is a method of printing a rip insert 1 onto a conveyor belt 2 in accordance with one or more embodiments.

Element 404 illustrates one technique forming a stack of printed rip insert by folding a layer printed magnetizable material and cutting the seam Other stacking techniques include seaming individual printed rip inserts, laminating, fusing, ultrasonic welding FIG. 5 is a method of printing a rip insert 1 onto a conveyor belt 2 in accordance with one or more embodiments. The method is provided for illustrative purposes and it is appreciated that suitable variations are contemplated.

The method of FIG. 5 can operate using systems such as system 100 and variations thereof.

The method includes a first block 502 where a flexible substrate comprised of an elastomeric material and/or rubber is pre-treated. The pre-treatment adapts a surface of the substrate to facilitate adhesion of printed material(s).

Magnetic materials are printed or coated onto the treated surface at block 504. A suitable printing technology, such as screen printing, coating, slot die coating, k-bar coating and the like can be used.

The magnetic materials can be formed as a stack comprising one or more layers of material where each layer is connected to adjacent layers.

The magnetic materials are polarized at block 506. The materials can be polarized in a wet state or a dry state.

The magnetic materials are post treated at block 508. For example, the post treatment can include baking, annealing, cross linking by heat, phot-crosslinking and the like.

Portions of the magnetic materials can be cut or removed at block 510.

The printed magnetic material can be magnetized at block 512.

The magnetic materials can be used as a printed rip insert element for rip detection and the like at block 514.

Printing and casting technologies can vary in terms of how the pattern is achieved, such that various printing and casting techniques and combinations of techniques can be utilized and not limited example techniques such as 3D printing, ink jet printing, screen printing, rotary printing, slot die coating, doctor blade coating and the like. It is appreciated that the choice of printing technique can be based on properties and nature of the magnetic rip insert and can also be based on framework aspects such as production space, existing machinery and/or output volume.

In one suitable example, a printing technique utilizes an ink or paste containing magnetizable materials (e.g., ferromagnetic metal particles such as nickel, cobalt, amongst others, metal oxides such as iron oxide, magnetic alloys such as $Nd_2Fe_{14}B$ and ferrites such as $CoFe_2O_4$, or mixtures of the above mentioned) that are transferred towards the described substrate materials by printing technologies listed above and post-treated by radiation methods such as, thermal, electromagnetic or light induced (such as infrared, UV, photo sintering) or thermal conduction methods such as hot plate placement to encounter for proper morphology in terms of uniformity, porosity and general mechanical properties (such as adhesion and film thickness). Printing step can be singular or performed multiple times consecutively, whereas the post-treatment step may follow consecutively after every print step or after multiple printing steps ("wet-on-wet print").

As described in the previous paragraph, the printed rip inserts could be produced in a similar off-line process and installed in the conveyor belt as a secondary process, similar to the wire-based inserts. However, it is envisioned that these printed rip inserts could be applied during an in-line process that could eliminate the need to embed the sensor into the belt during manufacture but instead automatically print the sensor in the appropriate location during the manufacturing process. In this case, care must be taken to select the appropriate substrate (belt material) that will allow for the printing and curing process to be done without generating adhesion or other belt manufacturing or performance issues.

The printed rip insert may be cured in presence of a magnetic field to influence or modify the rip inserts magnetic properties in terms of magnetic strength or polarization direction in order to improve the rip inserts detectability and hence field performance.

In some aspects, the techniques described herein relate to a printed rip insert element for a conveyor belt including: a flexible substrate; and a magnetic material printed on the substrate.

In some aspects, the techniques described herein relate to an insert element, the substrate including one of rubber and elastomeric material.

In some aspects, the techniques described herein relate to an insert element, the magnetic material formed as a stack of one or more ferromagnetic layers.

In some aspects, the techniques described herein relate to an insert element, the ferromagnetic layers connected by a plurality of folds.

In some aspects, the techniques described herein relate to an insert element, the magnetic material configured to have a first polarization.

In some aspects, the techniques described herein relate to an insert element, further including a second insert element having a unique polarization distinguishable from a polarization of the insert element.

In some aspects, the techniques described herein relate to an insert element, the magnetic material configured to generate parallel magnetic field lines in relation to one or more other insert elements.

In some aspects, the techniques described herein relate to an insert element, the magnetic material configured to generate non-parallel magnetic field lines in relation to one or more other insert elements.

In some aspects, the techniques described herein relate to an insert element, further including a protective layer formed over the magnetic material.

In some aspects, the techniques described herein relate to a conveyor belt monitoring system including: a plurality of printed rip insert elements on a substrate of a conveyor belt; a field generator for generating a magnetic field proximate the printed rip insert elements; and a detector for detecting an image of a magnetic field produced by the plurality of printed rip inserts.

In some aspects, the techniques described herein relate to a system, further including circuitry configured to monitor the magnetic field and identify damage to the conveyor belt based on the detected image of the magnetic field.

In some aspects, the techniques described herein relate to a system, the rip insert elements configured to generate parallel fields with each other.

In some aspects, the techniques described herein relate to a system, the rip insert elements including a plurality of parallel lines.

In some aspects, the techniques described herein relate to a method of forming a printed rip insert for a conveyor belt, the method including: adapting a surface of a substrate for adhesion of a magnetic material; forming a magnetic material on the adapted surface; forming a protective layer over the magnetic material; and polarizing the magnetic material.

In some aspects, the techniques described herein relate to a method, further including forming an intermediate layer over the magnetic material and forming a second magnet material over the intermediate layer.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially-relative terms, such as "inner", "adjacent", "outer", "beneath", "below", "lower", "above", "upper", and the like, may be used herein for ease of description to describe one element or feature's relationship to another element(s) or feature(s) as illustrated in the figures. Spatially-relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially-relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A printed rip insert element for a conveyor belt comprising:
    a flexible substrate;
    a magnetic material printed on the substrate; and
    the magnetic material formed as a stack of one or more ferromagnetic layers.

2. The insert element of claim 1, the substrate comprising one of rubber and elastomeric material.

3. The insert element of claim 1, further comprising a protective layer formed over the magnetic material.

4. The insert element of claim 1, the ferromagnetic layers connected by a plurality of folds.

5. The insert element of claim 1, the magnetic material configured to have a first polarization.

6. The insert element of claim 5, further comprising a second insert element having a unique polarization distinguishable from a polarization of the insert element.

7. A printed rip insert element for a conveyor belt comprising:
    a flexible substrate;
    a magnetic material printed on the substrate; and
    the magnetic material configured to generate parallel magnetic field lines in relation to one or more other insert elements.

8. The insert element of claim 7, the substrate comprising an elastomeric material.

9. The insert element of claim 7, the ferromagnetic layers connected by a plurality of folds.

10. The insert element of claim 7, the magnetic material configured to have a first polariton and the insert element further comprising a second insert element having a unique polarization distinguishable from a polarization of the insert element.

11. A printed rip insert element for a conveyor belt comprising:
    a flexible substrate;
    a magnetic material printed on the substrate; and
    the magnetic material configured to generate non-parallel magnetic field lines in relation to one or more other insert elements.

12. The insert element of claim 11, the substrate comprising an elastomeric material.

13. The insert element of claim 11, the ferromagnetic layers connected by a plurality of folds.

14. The insert element of claim 11, the magnetic material configured to have a first polariton and the insert element further comprising a second insert element having a unique polarization distinguishable from a polarization of the insert element.

15. A method of forming a printed rip insert for a conveyor belt, the method comprising:
    adapting a surface of a substrate for adhesion of a magnetic material;

forming a magnetic material on the adapted surface;
forming a protective layer over the magnetic material; and
polarizing the magnetic material.

16. The method of claim 15, further comprising forming an intermediate layer over the magnetic material and forming a second magnet material over the intermediate layer.

17. A conveyor belt monitoring system comprising:
a plurality of printed rip insert elements on a substrate of a conveyor belt;
a field generator for generating a magnetic field proximate the printed rip insert elements;
a detector for detecting an image of a magnetic field produced by the plurality of printed rip inserts;
circuity configured to monitor the magnetic field and identify damage to the conveyor belt based on the detected image of the magnetic field;
the rip insert elements configured to generate parallel fields with each other; and
the rip insert elements comprising a plurality of parallel lines.

18. The conveyor belt monitoring system of claim 17, the plurality of rip insert elements having a stack of one or more ferromagnetic layers.

19. The conveyor belt monitoring system of claim 18, the one or more ferromagnetic layers connected by one or more folds.

20. The conveyor belt monitoring system of claim 17, the plurality of insert elements comprising a first element configured to have a first polarization and a second element having a second polarization distinguishable from the first polarization.

* * * * *